United States Patent [19]

Strickler et al.

[11] Patent Number: 5,134,608
[45] Date of Patent: Jul. 28, 1992

[54] DISK DRIVE CRASH STOP

[75] Inventors: Mike T. Strickler; Jeffery G. Patrick, both of Boise, Id.

[73] Assignee: Hewlett-Packard Company, Palo Alto, Calif.

[21] Appl. No.: 532,470

[22] Filed: Jun. 1, 1990

[51] Int. Cl.⁵ .................... G11B 17/30; G11B 17/04; G11B 5/02; G11B 5/54
[52] U.S. Cl. .................................. 369/215; 369/203; 369/292; 360/105; 360/106; 360/109
[58] Field of Search ................... 360/105, 106, 109; 369/215, 219, 222, 292, 203

[56] References Cited

U.S. PATENT DOCUMENTS

| | | | |
|---|---|---|---|
| 4,635,151 | 1/1987 | Hazebrouck | 360/105 |
| 4,796,130 | 1/1989 | Shimanuki | 360/105 |
| 4,845,579 | 7/1989 | Wilkinson, Jr. | 360/106 |
| 4,890,176 | 12/1989 | Casey et al. | 360/105 |
| 4,937,692 | 6/1990 | Okutsu | 360/105 |
| 4,965,684 | 10/1990 | Stefansky | 369/75.1 |

Primary Examiner—Stuart S. Levy
Assistant Examiner—Tan Nguyen
Attorney, Agent, or Firm—E. F. Oberheim

[57] ABSTRACT

A disk drive having a disk stack and a movable actuator movable between position limits for moving one or more transducers between inner and outer radial limits with respect to the disk stack, established by a crash stop structure having at least one crash stop arm or projection for engaging the movable actuator and limiting actuator travel. The crash stop projection is stiff in the direction of actuator impact forces and is also displaceable from crash stop position in a direction different from the direction or impact forces, but biased to crash stop position, to permit forcible displacement of the crash stop projection in the different direction so that the actuator may be moved therepast during actuator installation or removal when assembling or disassembling the disk drive.

5 Claims, 6 Drawing Sheets

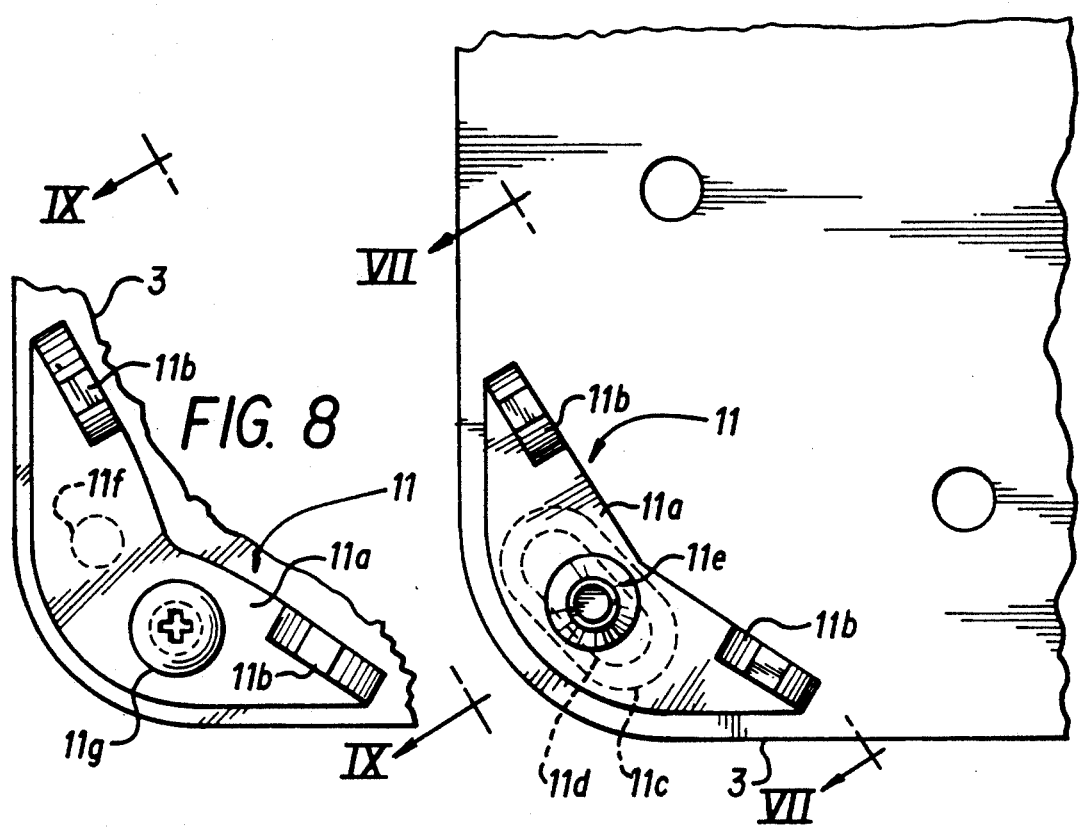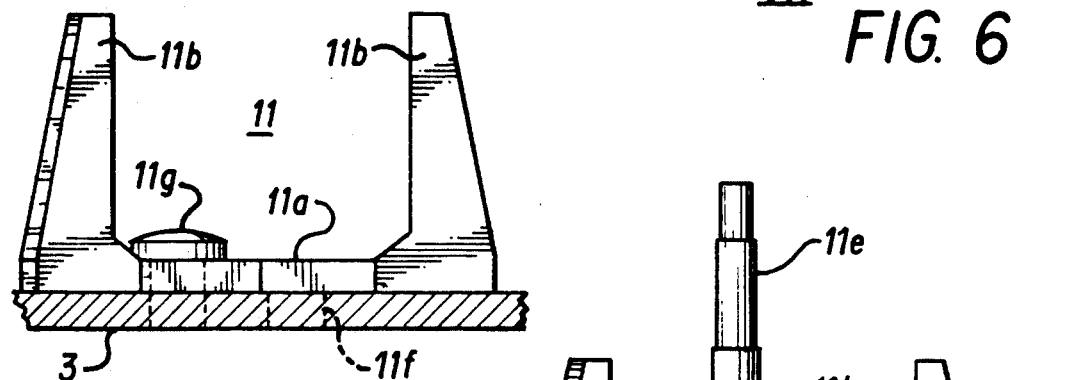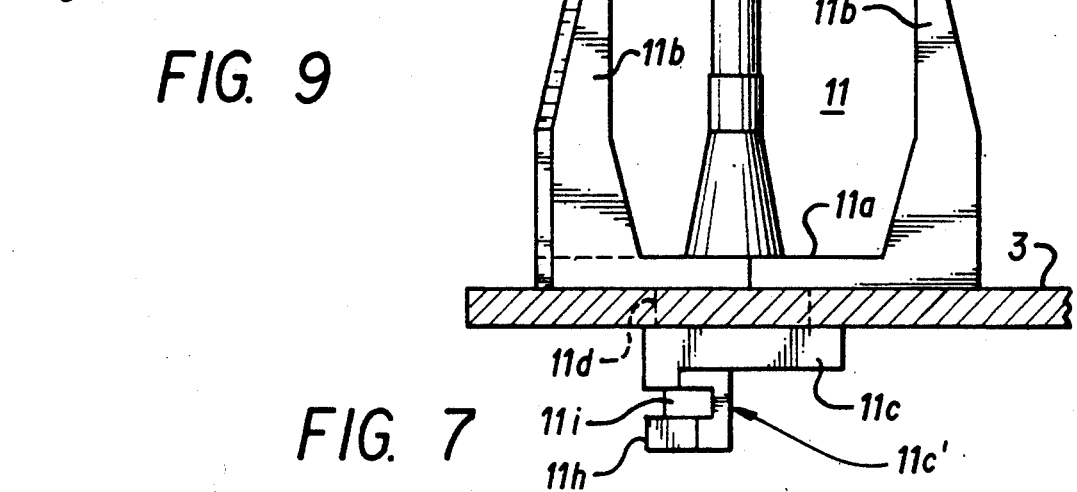

DISK DRIVE CRASH STOP

TECHNICAL FIELD

This invention relates generally to disk drives and more particularly to a disk drive having a crash stop structure which permits installation of the actuator during disk drive assembly with the crash stop structure in place.

RELATED APPLICATION

A copending application Ser. No. 07/531,992 of Mike T. Strickler and Richard L. Colbert, entitled "Disk Recording Device and Method of Fabrication", filed on the same date as this application and assigned to the assignee of this invention, is related to this application.

BACKGROUND OF THE INVENTION

Disk type recording devices, whether magnetic, magneto resistive or optical types, are high precision devices requiring the precise location and support of parts which interact in the positioning of a transducer head for recording or reading purposes. The recording devices are fabricated in a clean environment or cleaned prior to assembly in a clean environment and require a clean environment in which to function.

Disk type recording devices, such as disk memory drives, comprise at least one disk on which servo code and/or digital data is recorded in concentric or spiral tracks. At least one transducer mounted on a movable actuator is moved to a selected radial position to access selected data, which in a disk memory drive is usually at the request of a host computer.

The recorded tracks are bounded by tracks at inner and outer radial positions on the disk surface. Actuator movement is limited by limit stops or crash stops, which limit transducer displacement to inner and outer radial positions, at least radially inwardly and radially outwardly of the radial positions of those inner and outer tracks on which data is recorded. The function of these crash stops is to absorb the impact energy of the actuator thereagainst and to stop the actuator in the shortest possible distance without exceeding the acceleration force limits of the transducers and the transducer supports in the designed operational environment.

The crash stops in the two limits of actuator displacement may be the same or different, depending in part upon whether the actuator deceleration requirements are the same or different. In all disk drives presently known to the applicants, during assembly, after mounting of the disk or disks upon a base or support, the actuator with a transducer or transducers attached is movably mounted upon the base or support with the actuator and the transducers clear of the disks. With the transducers held in positions displaced from disk surfaces which they scan, the actuator is moved to load the transducers on the disks. The inboard or inner radial crash stop may be in place when the actuator is installed. The actuator is moved to position the transducers over the disk surfaces, whereat each of the transducers are released to engage the adjacent surface of a disk in an area between the outer data track and the disk spindle. Thereafter, the outer radial crash stop is installed. Such installation of the outer radial crash stop after transducer loading now requires handling of the partially assembled recording device, risking damage to its delicate parts.

SUMMARY OF THE INVENTION

An improved and unique crash stop structure is provided according to this invention, in which the outer and inner radial limit crash stops are installed prior to the installation of the actuator. In the initial installed position of the actuator, the magnetic heads are clear of the disks. The outer radial crash stop is forcibly displaced either by the actuator as it is moved, or manually, or otherwise, from its outer radial limit crash stop position, to permit movement of the actuator therepast, as the actuator is moved from its initial installation position on the actuator mount in the direction to load the transducers on the disk. Disassembly is accomplished by reversing the installation sequence of operations.

In a linear disk drive the actuator mount is usually a track on which the actuator moves or rolls in a direction radially of the disks. In a rotary disk drive, the actuator mount is a spindle on which the actuator rotates.

The actuators are provided with impact parts or features having surfaces which impact the inner and outer radial crash stops respectively. Both crash stops exhibit stiffness in the direction of actuator impact forces in a degree to provide the required crash stop function, that is applying a decelerating force acting on the actuator and stopping of the actuator in each crash stop position or limit without exceeding the acceleration force limits on the actuator structure, especially the transducer head mounts or flexures. The outer radial crash stop additionally exhibits limited resilient or elastic displaceability from crash stop position in a direction different from the direction of the actuator impact force, to permit forcible displacement of the outer radial crash stop in said different direction, from the crash stop position to a displaced position, permitting said impact part of said actuator to move therepast.

Force interaction between said impact part on said actuator and said crash stop may be such as to forcibly displace said crash stop in said different direction upon movement of said actuator in a direction to load or to unload said transducers, or, in the alternative, the crash stop may be forced manually, or otherwise forcibly displaced in said different direction, independently of movement of said actuator, to permit clearance of said impact parts or features of the actuator surface therepast as said actuator is moved in a direction to load or to unload said transducers.

Resilience and flexibility of the outer radial crash stop may be achieved by providing an outer radial crash stop which is movably mounted only in said different direction and resiliently biased to crash stop position, or, by fabricating the outer radial crash stop of a material, plastic or metal, having a physical property and structural configuration providing stiffness in the required degree in the direction of actuator impact forces and resilience and/or flexibility from crash stop position in said different direction. In either structural configuration, when displacement forces acting in said different direction are removed, the outer radial crash stop moves or snaps back to functional crash stop position.

BRIEF DESCRIPTION OF THE DRAWINGS

The invention will be better understood by reference to the following specification when considered in conjunction with the accompanying drawings, in which:

FIG. 6 is a plan view drawn to an enlarged scale of a further embodiment of the crash stop structure of this invention.

FIG. 7 is a sectional view taken on the line VII—VII of FIG. 6.

FIG. 8 is a plan view showing a modification of the attachment of the crash stop structure to the disk drive base, and FIG. 9 is an elevational view of the crash stop structure taken on the line IX—IX of FIG. 8.

BEST MODE FOR CARRYING OUT THE INVENTION

The best mode presently known to the applicants for practicing this invention comprises it's application in a rotary actuator type of magnetic disk drive, as illustrated and described herein. Applications to linear actuator disk memory drives will be readily apparent to those skilled in the art.

Figure 1:
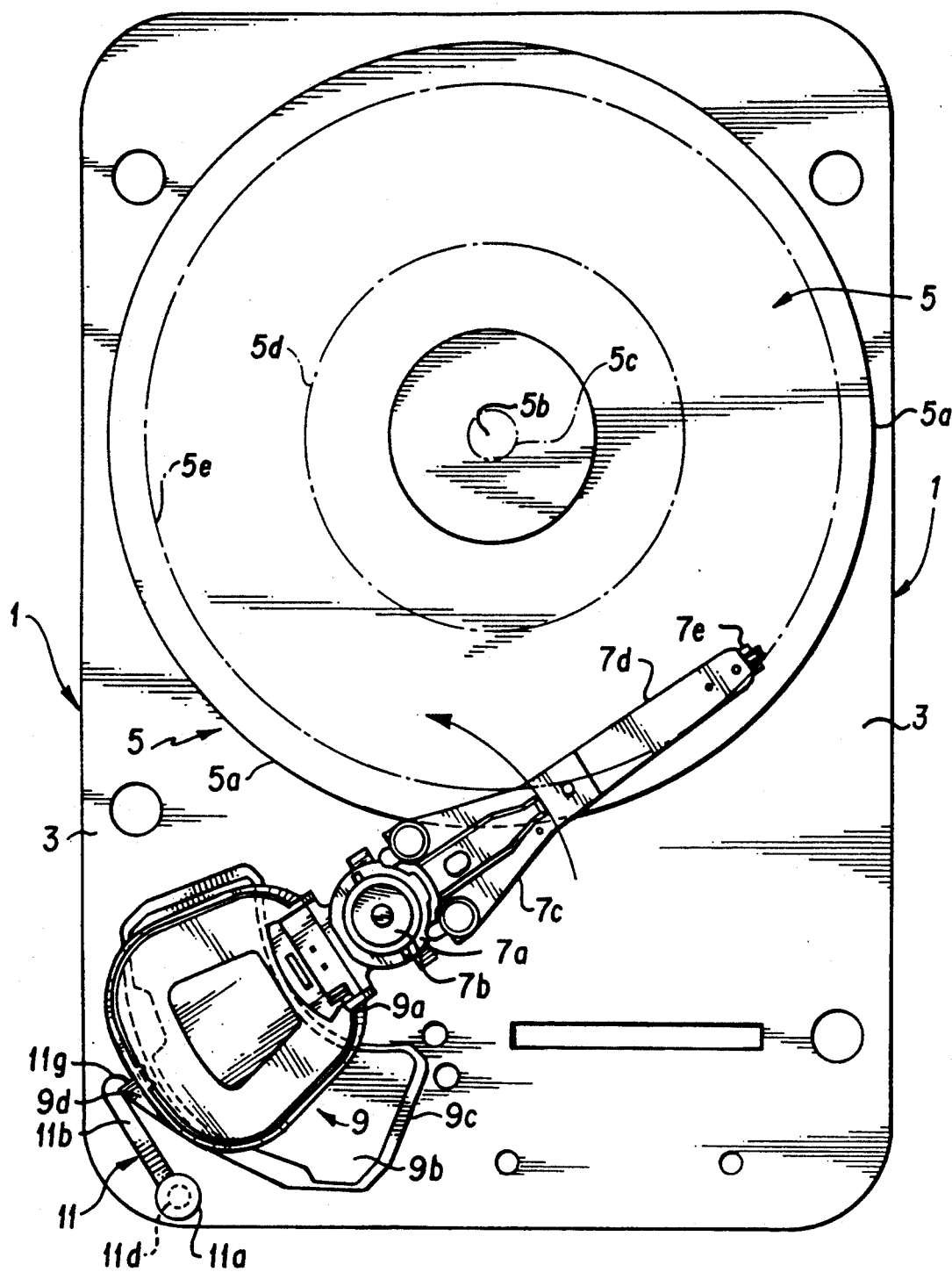
FIG. 1 is a plan view of a rotary actuator disk drive illustrating one embodiment of this invention.
Figure 2:
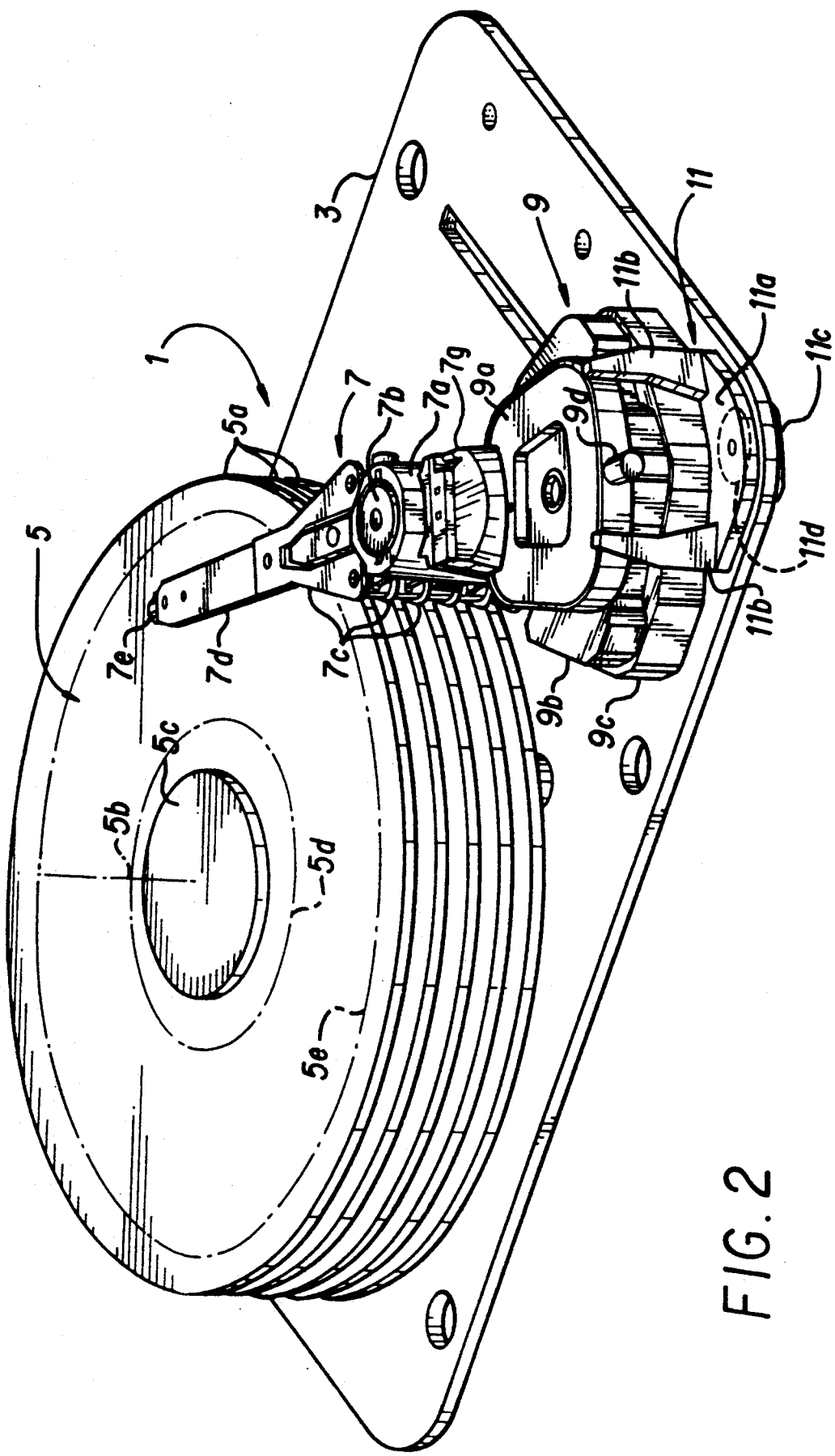
FIG. 2 is an isometric view of a preferred embodiment of this invention representing the presently known best mode for practicing this invention.
Figure 3:
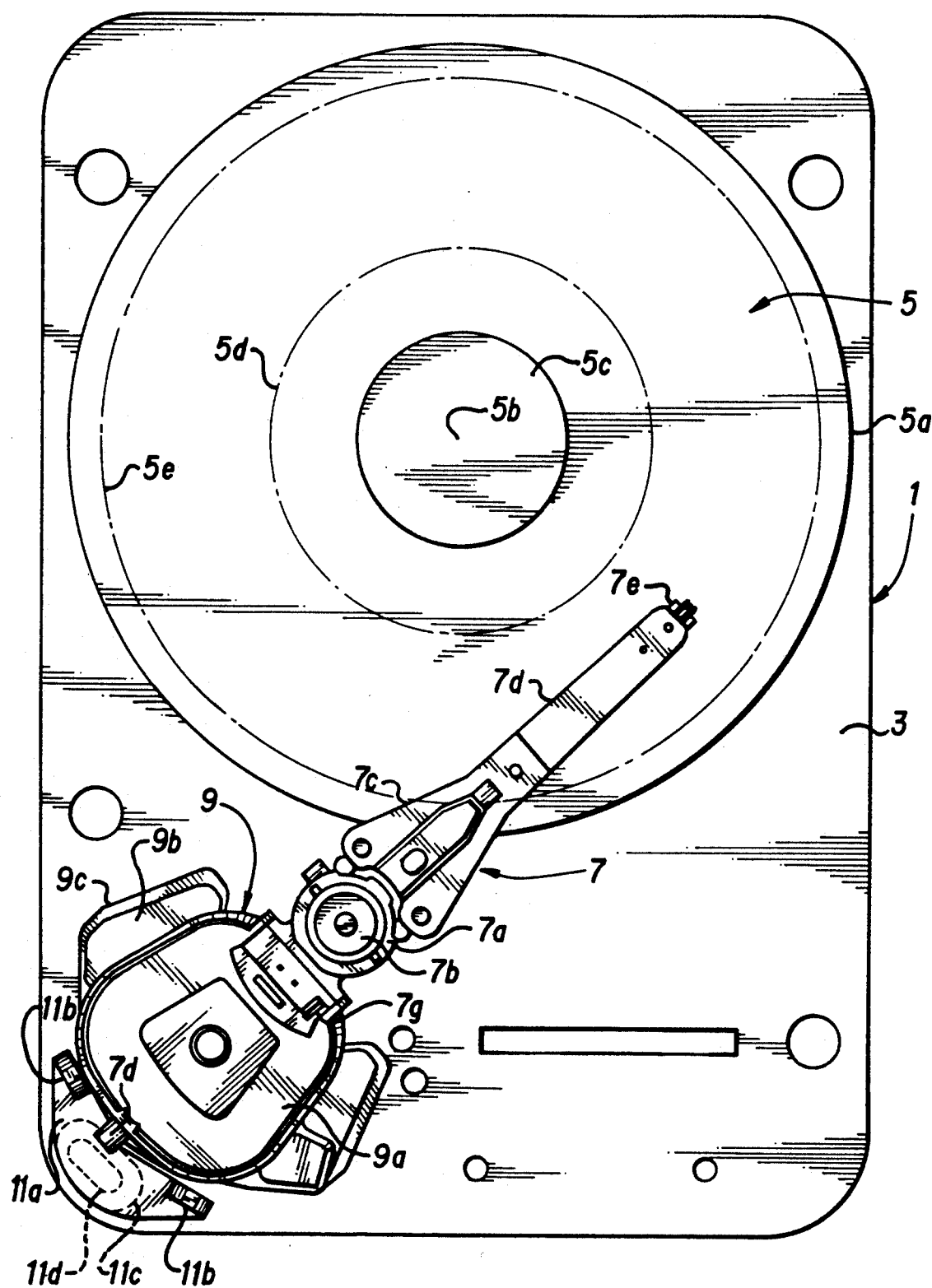
FIG. 3 is a plan view of the rotary actuator disk drive of FIG. 2.

As seen in the drawings, and with particular reference to FIGS. 1, 2 and 3, the rotary actuator disk drive generally designated 1 comprises a base or support plate 3, a disk stack 5 and an actuator 7.

The disk stack 5 is mounted for rotation at constant speed by a motor (not shown), about an axis 5b of a disk spindle structure 5c secured to the base plate 3.

A rotary actuator 7 comprises a bearing housing 7a which is rotatably mounted about the spindle 7b which is also secured to the base plate 3. Arms 7c, forming part of an arm stack are mounted upon the bearing housing 7a in axially spaced positions in planes adjacent to the surfaces of the individual disks 5a and, in operation, project between the disks. Load beams 7d, sometimes also referred to as flexures, are individually attached to the free end of each arm 7c at it's extremity. Each load beam mounts an individual transducer 7e, such as a magnetic head. Each transducer 7e is disposed in confronting relationship with the adjacent surface of one disk 5a. The actuator 7 is rotated about the spindle 7b to move the transducer 7e radially and then to radially position a transducer 7e over the adjacent surface of a disk 5a at a selected track, for track seeking and track following modes of operation, respectively, as is well known, by means of an actuator motor 9.

This actuator motor 9 comprises a coil structure 9a. The coil structure 9a is attached to the bearing housing 7a and the center line of the coil structure is preferably diametrically positioned disposed with respect to the center line of the arms 7c and load beams 7d on the opposite side of the axis of the actuator spindle 7b. In this position the coil structure 9a moves bidirectionally in an arc about the axis of the actuator spindle 7b. The coil structure 9a is disposed between a pair of two pole permanent magnets, one above and one below the coil structure 9a. Only one two pole permanent magnet 9b is needed to demonstrate operation. Only the lower permanent magnet is shown in these illustrations in the interest of clarity. The lower permanent magnet 9b is disposed upon a steel motor base 9c which is attached to the base plate. Bidirectional movement of the coil structure 9a in its arc in the field of the permanent magnet is achieved, as is well known, by reversibly energizing the coil (not shown) of the coil structure 9a.

Referring now to FIG. 1, one embodiment of the snap crash stop of this invention is illustrated. The outer radial limit of angular mechanical movement of the rotary actuator 7 is determined by the crash stop 11. In this figure, only the outer radial limit crash stop structure 11 is shown in the interest of simplicity. It will be appreciated that an inner radial limit crash stop is also employed in practice. The outer radial crash stop structure 11 has a crash stop support member 11a secured to the base plate 3. A crash stop projection 11b in the form of a flexible arm projecting from the support member 11a, is provided with a latch 11g at its extremity which is engaged with a catch 9d on the outer edge of the coil structure 9a. As will be seen by reference to FIG. 4, during assembly the actuator 7 is mounted upon the actuator spindle 7b which is attached to the base plate 3, which allows actuator rotation about the axes of the spindle 7b. In this first step of actuator installation, all parts of the actuator 7 are clear of the disk stack 5 and the crash stop structure 11. Loading of the transducers 7e upon the disks is accomplished by spreading the transducers apart a distance to clear the thickness of the disk. In practice, one transducer 7e normally will be positioned on the top surface of a disk and a second transducer 7e will be positioned on a bottom surface of that disk, as is well known. When the transducers 7e are spread apart, the actuator is rotated counter-clockwise in the direction of the arrow, as seen in FIG. 5, and the transducers 7e are moved across the surface of the disk but out of contact with the surface of the disk. As this counter-clockwise rotation is in progress and the transducers 7e move past the circumferential edge of the disks, the latch 11g on the end of the arm 11b rides up the ramp of the catch 9d. In the position shown in FIG. 1, the latch 11g moves past the edge of the ramp of the catch 9d and snaps into place, as shown. In this position, the actuator arm is in its outer radial limit position with the transducer 7e positioned on the disk surface outside of the outer data track 5e.

The crash stop structure 11 may be made of any suitable material which may be elastically bent or deflected so that the catch 9d on the actuator 7 can clear the latch 11g during assembly and thereafter the latch 11g will return to it's functional crash stop position. Suitable crash stop materials include plastics and metals which are sufficiently flexible and resilient for the application. The crash stop structure 11 is designed of a structural configuration to provide stiffness or rigidity in the direction of impact forces, resulting from engagement of the confronting faces of the catch 9d and the latch 11g when the actuator moves into its outer radial limit position, but which is sufficiently flexible and resilient in a direction different from the direction in which the impact forces are applied, to permit installation of the actuator 7 onto the base or support plate 3 in a position in which the actuator 7 is clear of the disk stack 5 and the crash stop structure 11, and thereafter permitting movement of the actuator in a counter-clockwise direction, as described, so that the catch 9d moves past the latch 11g, and the latch 11g returns to it's original position so that the outer radial limit crash stop is functional.

While the crash stop structure 11 may be fabricated from any material having the described physical characteristics and may be attached to the base or support plate 3 in any suitable manner, a presently preferred fabrication technique, and best mode for practicing the invention, employs outsert casting in which the base or support 3 becomes a part of the mold structure and the crash stop 11 is outsert molded in place on the base or support plate 3, and secured thereto via an opening 11d therethrough. Polycarbonate is one of many suitable plastic material for this purpose.

FIG. 1 serves to provide an easily understood illustration of this invention both as to its principles of operation, and as to its structural design.

The best mode presently known to the applicants for practicing this invention however, is illustrated in FIGS. 2-7, using a rotary actuator without limitation, however, as to its application to rotary or linear actuators.

In FIGS. 2-5, the limit 5 of angular mechanical movement of the rotary actuator 7 are determined by a crash stop structure 11 having a crash stop support member 11a on the base or support plate 3 and circumferentially spaced crash stop projections, such as the tapered cantilever arms 11b, projecting upwardly from the support member 11a. These arms 11b are positioned on opposite sides of a pin 9d which radially projects from the end face of the coil structure 9a between the crash stop arms 11b. Engagement of the pin 9d with the respective crash stop arms 11b determines the opposite limits of angular movement of the actuator 7 and, hence, the inner and outer radial mechanical limits of movement of the individual transducers 7e with respect to the adjacent surface to the respective disks. As seen in FIG. 2, the position of the left crash stop arm 11b determines the outermost radial position of the transducer 7e. This position is usually outside of the outermost data track 5e on the surface of the disk. The crash stop arm 11b on the right, as seen in FIG. 2, determines the innermost position of the transducer 7e, which is usually between the spindle 5c and the innermost data track 5d on the surface of a disk 5a. The crash stop structure 11 has a lower flange 11c on the bottom side of the base or support plate 3, as seen in FIG. 2, which is an integral part of the crash stop structure 11, by means of an integral connection extending through an opening 11d in the base or support plate 3. This opening 11d is of any configuration for the purpose of sealing the mounting for positional stabilization and for securing the crash stop structure 11 against linear or angular movement. The opening 11d is in a predetermined position at least with respect to the axis of the actuator spindle 7b and preferably with respect to both the disk spindle axis 5b and the axis of the spindle 7b.

The crash stop structure 11 is fabricated of a plastic material such as polycarbonate which may be outsert molded. Outsert molding techniques are well known and they are not described herein in any detail, but only to the extent that the base or support plate 3 is inserted between the two halves of a mold, the lower half of which has a cavity providing a lower flange 11c and the upper half of which has a cavity corresponding to the particular configuration of the crash stop structure 11. In practice, it is important that these mold cavities be located precisely with respect to the axes of the spindles of the actuator and the disk stack, so that the arms 11b are positioned, when engaged by the pin 9d, to limit the extremes of movement of the magnetic heads 7e on the disk surface areas just beyond the inner and outer data tracks 5d and 5e that is, beyond the data tracks.

A plastic material suitable for this molding operation, again, is polycarbonate which may be glass or carbon filled. As seen in FIG. 2, and in the plan views of FIGS. 3, 4 and 5, and in the enlarged views of FIGS. 6 and 7, the cantilever crash stop arms 11b are non-uniformly tapered between their wide bases and their narrower upper ends and are of lesser thickness than of width. The purpose of this is to provide adequate stiffness in the direction of forces resulting from impact of the pin 9d with a confronting edge of a crash stop arm 11b and to provide flexibility in a direction different from the direction of the impact force, so that the outer radial limit crash stop member 11b, on the left as seen in FIG. 2, for example, may be displaced away from the end of the pin 9d, to permit the outer end of the pin 9d to move therepast whenever the transducers 7e are being loaded or unloaded with respect to or on the disk 5a.

Figure 4:
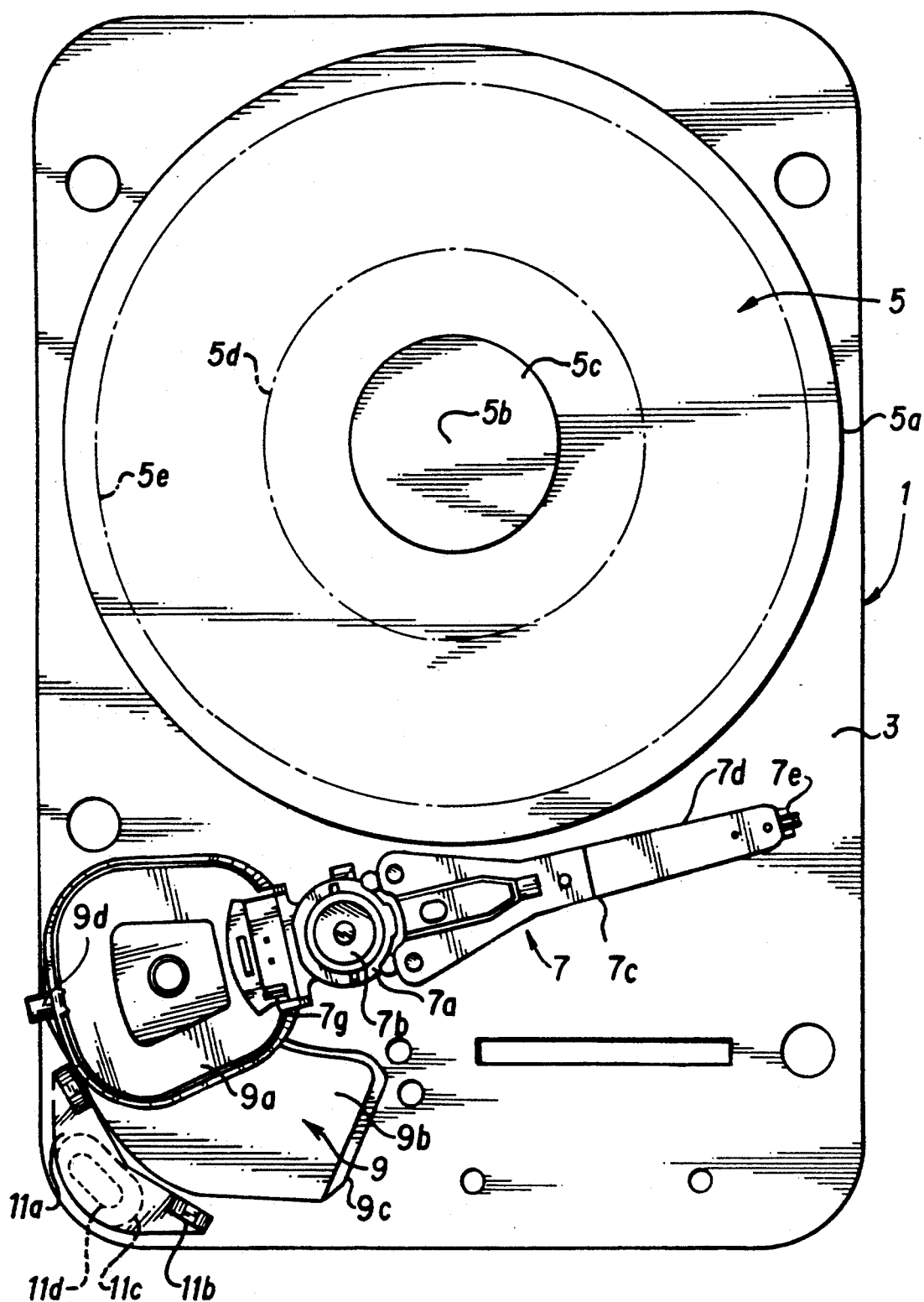
FIG. 4 is a plan view of the rotary actuator disk drive showing the rotary actuator in its installed angular position.
Figure 5:
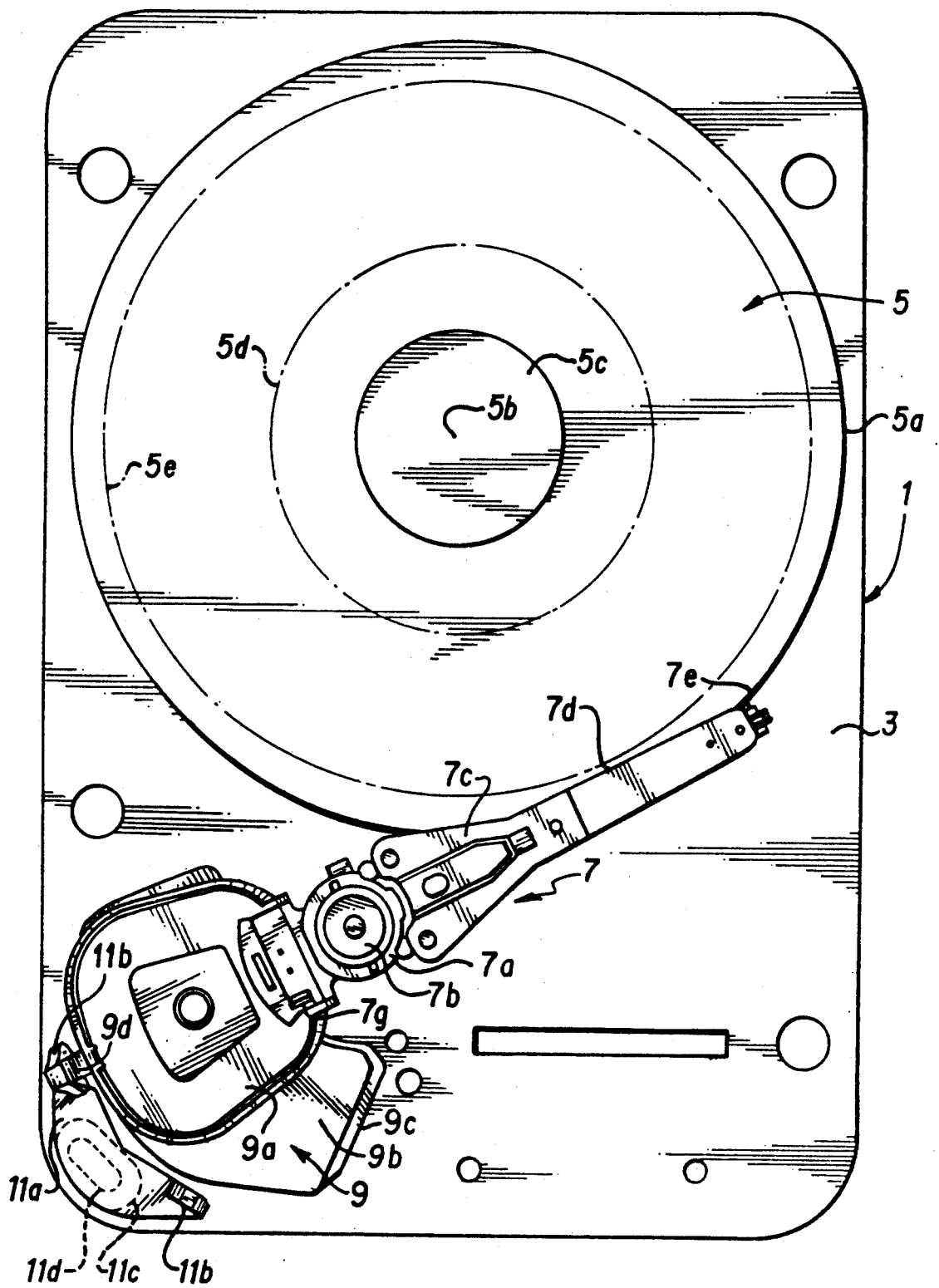
FIG. 5 is a plan view of the rotary actuator disk drive showing the rotary actuator in its head loading angular position.

Two steps or stages for this assembly operation are seen in FIGS. 4 and 5. In FIG. 4, the actuator 7 is installed upon the base or support plate 3 in the first step of the assembly operation, in an angular position in which the actuator is clear of the disk stack 5 and the crash stop structure 11. In this angular position, the pin 9d is located outside of the limits of the crash stop arms 11b. In the next step of the assembly, the transducers 7e are spaced apart sufficiently to clear the surfaces of the disks 5a. The crash stop arm 11b on the left, as seen in FIG. 5, is bent or deflected by applying a force at its upper end in a radially outward direction with respect to the axis of the actuator spindle 7b. The extent of the deflection is sufficient to clear the end of the pin 9d past the confronting face of the left crash stop arm 11b. Further counter-clockwise movement of the actuator 7 positions the pin 9d between the crash stop arms 11b in some angular position, such as that seen in FIG. 3, for example. Thus, the crash stop structure 11 may be assembled upon the base plate 3 prior to the time of installation of the actuator eliminating the need for the handling of separate parts and the need for attempting to assemble the crash stop structure 11 on the base plate 3 after the actuator 7 with its delicate transducers 7e has been installed.

FIGS. 6 and 7 illustrate the crash stop structure in greater detail at an enlarged scale. In this embodiment, a post 11e has been added as part of the outsert molded crash stop structure. This post is used to support other parts not shown of the disk drive. As will be seen in FIG. 7, which is a sectional view taken on the line 7—7 of FIG. 6, the crash stop structure 11 is integrally formed with a part 11c1 having a retaining flange 11c beneath the base or support 3. This flange 11c is an integral part of the crash stop structure through the elongated opening 11d provided in the base or support plate 3. In this instance, the part 11c1 beneath the base plate 3 has a function beyond that of just a flange and is configured with a depending section 11h provided with a slot 11i which is useful in receiving and supporting a part of a circuit board, for example (not shown).

Although the best mode for practicing this invention involves an outsert molded crash stop structure 11, the internal crash stop structure 11 may be secured by other means. Such means are illustrated in FIGS. 8 and 9 of which FIG. 9 is an elevational view of FIG. 8 taken on line IX—IX associated with FIG. 8. The crash stop structure 11 in FIGS. 8 and 9 is again a molded part, preferably again of a plastic such as polycarbonate. It is provided with a pin 11f projecting downwardly from the bottom side of the base 11a of the crash stop 11. This is an indexing pin which fits into an opening in the base or support plate 3, and is used to precisely locate the crash stop. The crash stop 11 is secured by means of a screw 11j which clears through the support member 11a and threadedly engages the base plate 3 of the disk drive.

Otherwise, the embodiments of FIGS. 6-9 are the same as that discussed in connection with FIGS. 2-5, being provided with the cantilever crash stop arms 11b which function as cantilever beams projecting from the crash stop support member 11a. As described, these cantilever crash stop arms 11b are of designed stiffness in the direction of crash stop impact forces, at least that the outer radial limit crash stop arm 11b is flexible in a direction different from that in which the impact forces act. The direction as seen in all of these figures is substantially at right angles to the direction in which the impact force acts.

The crash stop structure 11 can be fabricated of materials other than plastic and can be fabricated by means and techniques other than that involving molding processes. For example, a crash stop structure 11 such as seen in FIGS. 6-9 is easily fabricated of metal. If fabricated of sheet metal it can be cut or stamped as a flat pattern. The crash stop arms 11b can then be bent to the position shown with respect to the support member 11a. If fabricated of a metal in the annealed or soft state, heat treating thereafter can be employed to provide the flexibility or resilience of the crash stop arms 11b to function properly. Such a crash stop structure 11 fabricated of sheet metal is conveniently attached to the disk drive base 3 in the manner illustrated in FIGS. 8 and 9. Indexing can be achieved by a shallow stamped depression at the location of the pin 11f in the metal base 11a of the crash stop structure 11, by well known fabrication techniques, during the stamping operation.

Although particular configurations of the crash stop structure 11 have been illustrated herein, it will be appreciated that other configurations involving the provision of structures providing crash stop surfaces on the actuator 7 different from that of the single pin 9d may be developed. The principle of this invention is simply that of providing an outer radial crash stop structure 11 which may be attached to the base plate 3 prior to the time of installation of the actuator, and having an outer radial limit crash stop arm 11b, which is deflectable from crash stop position in a direction different from that in which the crash stop forces act upon that arm 11a, for the purpose of clearing any actuator impact surface or projection 9d on the actuator 7, which cooperates with the outer radial limit crash stop arm 11b, for the purpose of limiting displacement of the actuator 7 in its outer mechanical radial limit.

What is claimed is:

1. A recording device, comprising:
  a support;
  at least one disk having recordings in radially spaced tracks in a surface of said disk;
  means for mounting said disk on said support for rotation about an axis;
  at least one transducer for each disk;
  movable actuator means on said support movable between position limits for supporting said at least one transducer adjacent to said surface of said disk for movement of said at least one transducer to different radial positions between radial position limits on said disk;
  motor means for moving said movable actuator means between said position limits;
  a crash stop structure having a member secured to said support and having a cantilever crash stop arm integral with said member, said arm having a part thereon projecting into a path of movement of said movable actuator means, for engaging said movable actuator means in one of said position limits, said cantilever crash stop arm being mechanically stiff in a direction of impact forces between said actuator means and said part of said cantilever crash stop arm, and being flexible and displaceable from crash stop position in a direction substantially perpendicular the direction of said impact forces, to remove said part from said path to clear said movable actuator means therepast during installation and removal of said movable actuator means.

2. The invention according to claim 1, in which:
  said cantilever crash stop arm has a dimension in the direction of said impact forces greater than the thickness of said arm to provide crash stop arm stiffness in the direction of said impact forces and crash stop arm flexibility in said different direction.

3. The invention according to claim 1, in which:
  said cantilever crash stop arm projects from said member in a direction substantially along the path of movement of said actuator means with said part projecting into the path movement of said movable actuator means.

4. The invention according to claim 3, in which:
  said part on said cantilever crash stop arm comprises a latch, and
  a catch disposed on said movable actuator means for engaging said latch when said movable actuator means is in one of said position limits.

5. The invention according to claim 1, in which:
  said cantilever crash stop arm displacement in said different direction is essentially elastic.

* * * * *